A. CROSBY.
Potato Diggers and Cultivators.
No. 158,251.  Patented Dec. 29, 1874.
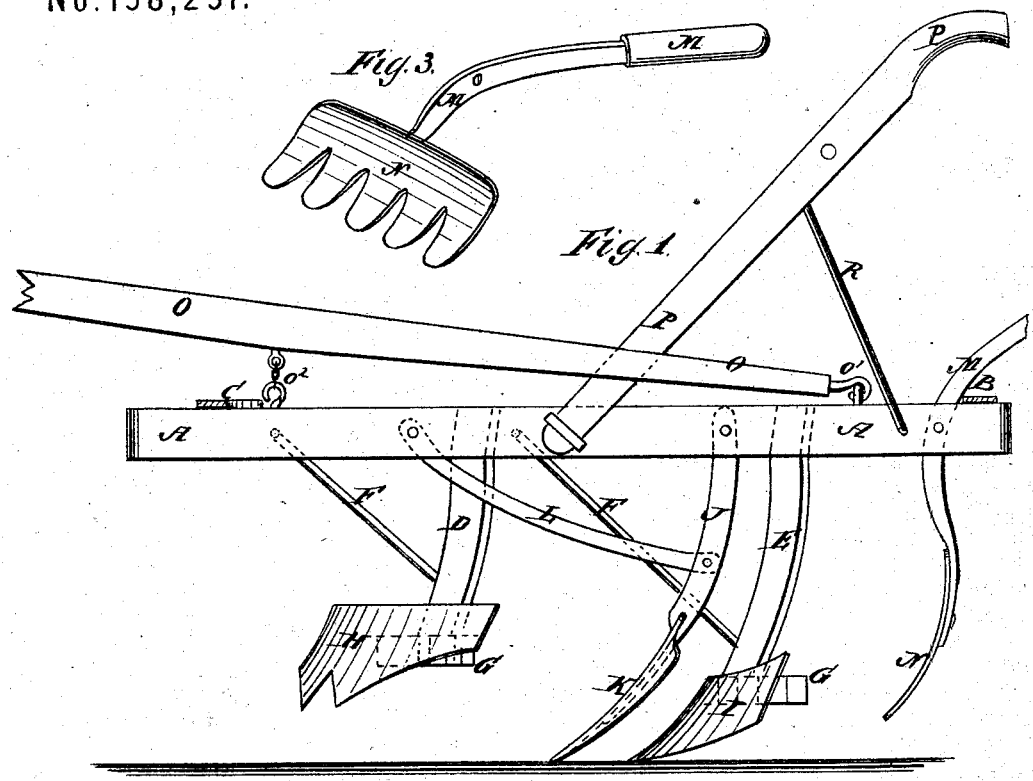
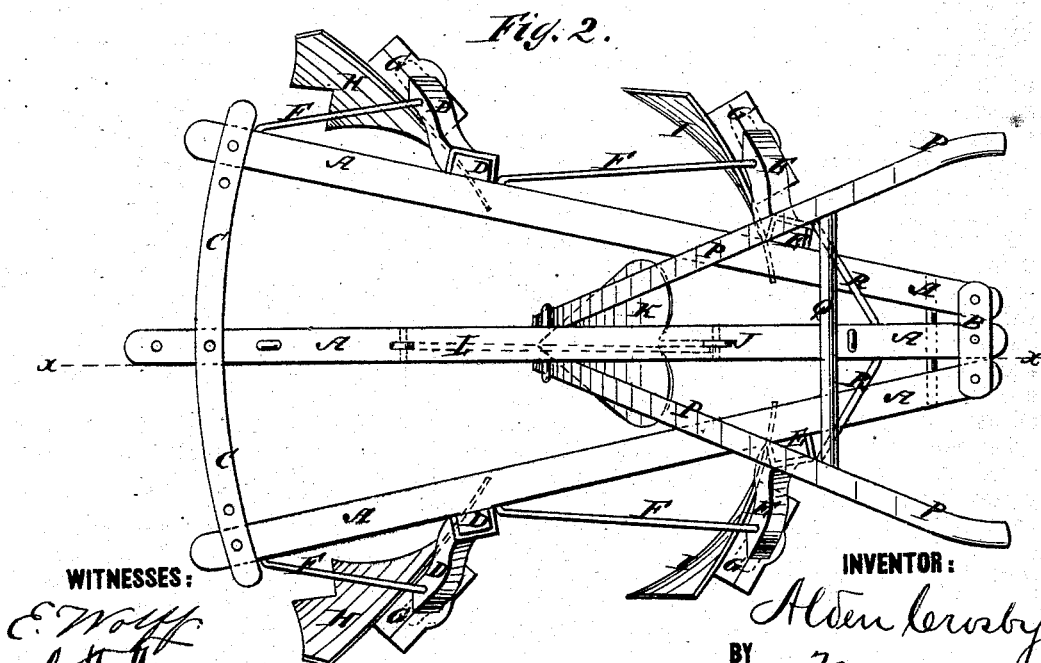

UNITED STATES PATENT OFFICE.

ALDEN CROSBY, OF GRAY, NEW YORK.

IMPROVEMENT IN POTATO DIGGERS AND CULTIVATORS.

Specification forming part of Letters Patent No. 158,251, dated December 29, 1874; application filed October 3, 1874.

*To all whom it may concern:*

Be it known that I, ALDEN CROSBY, of Gray, in the county of Herkimer and State of New York, have invented a new and useful Improvement in Potato Digger and Cultivator, of which the following is a specification:

Figure 1 is a longitudinal section of my improved machine, taken through the line $x\ x$, Fig. 2. Fig. 2 is a top view of the same. Fig. 3 is a detail perspective view of the separator detached.

Similar letters of reference indicate corresponding parts.

The invention will first be fully described, and then pointed out in the claims.

A are three beams, the rear ends of which are connected and pivoted to each other by being bolted to a short connecting bar or plate, B. The forward ends of the three beams A are spread apart, and are connected by a curved bar, C, to which they are secured by pins or bolts.

Several holes are formed in the end parts of the bar C to receive the pins or bolts that secure the side beams, so that the forward ends of the said beams may be adjusted closer together or farther apart, as may be desired.

To the side beams A are attached the plow-standards D E, which are strengthened against the draft strain by braces F, in the ordinary manner, and the forward standards D of which are made shorter than the rear ones E, so that the rear plows may work deeper than the forward ones. Upon the lower ends of the standards D E are formed round tenons, upon which are formed blocks G, which may be secured adjustably to said tenons by set-screws or other convenient means, and to which are secured the plow-plates. The forward plow-plates H are made with teeth upon the outer part of their lower edges, and their inner parts or wings are so formed as to throw the soil toward and around the plants, and round it up into a ridge. The rear plow-plates I are so formed as to move the soil farther inward, and complete the formation of a ridge around the plants.

When the machine is to be used as a potato-digger, the plow-plates H I are so adjusted as to remove the soil from the sides of the ridge, and to the center-beam is attached, a little in front of the rear standards E, a standard, J, to the lower end of which is attached a sharp-pointed plow, K, and which is supported against the draft strain by a brace, L. The plow K opens up the hills, and throws out the potatoes. To the rear ends of the beams A is pivoted a standard, M, to the lower end of which is attached a forked plate, N, and the upper end of which projects into such a position that it may be conveniently reached and operated by the driver.

The device M N is designed to rake over the soil thrown up by the plow K, and thus separate the potatoes from it, leaving the said potatoes lying upon the top of the said soil. The draft is attached to the forward end of the central beam A.

O is the tongue, the rear end of which is pivoted to the rear part of the central beam A by a hook and eye, $o^1$, or other suitable connection. The tongue O is connected with the forward part of the center-beam A by a link-connection, $o^2$, to allow the machine to have a lateral movement upon the tongue O, to enable it to be guided in following a row. P are the handles, the forward ends of which are secured to the middle part of the center-beam A. The handles P are connected by a round, Q, and are supported at the proper elevation by the braces R, the lower ends of which are attached to the rear part of the center-beam A.

Having thus described my invention, what I claim as new, and desire to secure by Letters Patent, is—

1. The combination of the center plow J K L with the three rearwardly-converging beams A, the standards D E, and the plows H I, substantially as herein shown and described.

2. The combination of the separator M N with the center plow J K L, the three rearwardly-converging beams A, the standards D E, and the plows H I, substantially as herein shown and described.

ALDEN CROSBY.

Witnesses:
JOHN G. BARRY,
GEORGE LONGSTAFF, Jr.